United States Patent
Penner (10) Patent No.: US 12,520,966 B1
(45) Date of Patent: Jan. 13, 2026

(54) PORTABLE OUTDOOR COOLING GRATE FOR USE WITH AN OPEN FIRE

(71) Applicant: Rhett Penner, Kola (CA)

(72) Inventor: Rhett Penner, Kola (CA)

( * ) Notice: Subject to any disclaimer, the term of this patent is extended or adjusted under 35 U.S.C. 154(b) by 717 days.

(21) Appl. No.: 17/943,323

(22) Filed: Sep. 13, 2022

(51) Int. Cl.
*A47J 37/07* (2006.01)
*A47J 33/00* (2006.01)

(52) U.S. Cl.
CPC ........... *A47J 37/0772* (2013.01); *A47J 33/00* (2013.01)

(58) Field of Classification Search
CPC .... A47J 37/07; A47J 37/0704; A47J 37/0763; A47J 37/0772; A47J 37/0777; A47J 37/0786; A37J 33/00
See application file for complete search history.

(56) References Cited

U.S. PATENT DOCUMENTS

| | | |
|---|---|---|
| 2,604,884 A | 7/1952 | Brooks |
| 4,532,912 A | 8/1985 | Burnside, III |
| 4,553,525 A | 11/1985 | Ruble |
| 4,932,391 A * | 6/1990 | Bierdeman ......... A47J 37/0745 126/30 |
| 4,979,490 A | 12/1990 | Nudo |
| 7,013,885 B2 * | 3/2006 | Czajkoski ............... F24B 1/182 126/30 |
| 8,151,784 B2 | 4/2012 | Czajkoski |
| 8,272,601 B2 | 9/2012 | Kocher |
| D718,081 S | 11/2014 | Rinderle |
| 10,736,462 B2 | 8/2020 | Hofer |

FOREIGN PATENT DOCUMENTS

| | | | |
|---|---|---|---|
| CA | 2247836 | 3/2000 | |
| FR | 2494102 A1 * | 5/1982 | .......... A47J 37/0772 |

* cited by examiner

*Primary Examiner* — Hung D Nguyen
(74) *Attorney, Agent, or Firm* — Kyle A. Fletcher, Esq.

(57) ABSTRACT

The portable outdoor cooking grate for use with an open fire is configured for use with a fire pit. The portable outdoor cooking grate for use with an open fire is a mechanical structure that is placed over the combustion reaction. The portable outdoor cooking grate for use with an open fire is configured for use with a foodstuff. The portable outdoor cooking grate for use with an open fire cooks the foodstuff. The portable outdoor cooking grate for use with an open fire comprises a pedestal structure, a stanchion structure, and a grill structure. The pedestal structure forms a base that transfers the load of the stanchion structure and the grill structure to a supporting surface. The stanchion structure elevates the grill structure above the pedestal structure. The grill structure elevates the foodstuff over the combustion reaction.

13 Claims, 6 Drawing Sheets

PORTABLE OUTDOOR COOLING GRATE FOR USE WITH AN OPEN FIRE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of portable barbecues for use in a firepit. (A47J37/0772)

Summary of Invention

The portable outdoor cooking grate for use with an open fire is configured for use with a fire pit. The fire pit is a structure that is used to safely contain a combustion reaction. The portable outdoor cooking grate for use with an open fire is a mechanical structure that is placed over the combustion reaction. The portable outdoor cooking grate for use with an open fire is configured for use with a foodstuff. The portable outdoor cooking grate for use with an open fire cooks the foodstuff. The portable outdoor cooking grate for use with an open fire comprises a pedestal structure, a stanchion structure, and a grill structure. The pedestal structure forms a base that transfers the load of the stanchion structure and the grill structure to a supporting surface. The stanchion structure elevates the grill structure above the pedestal structure. The grill structure elevates the foodstuff over the combustion reaction.

These together with additional objects, features and advantages of the portable outdoor cooking grate for use with an open fire will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable outdoor cooking grate for use with an open fire in detail, it is to be understood that the portable outdoor cooking grate for use with an open fire is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable outdoor cooking grate for use with an open fire.

It is therefore important that the claims be regarded as including such equivalent construction insofar as they do not depart from the spirit and scope of the portable outdoor cooking grate for use with an open fire. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
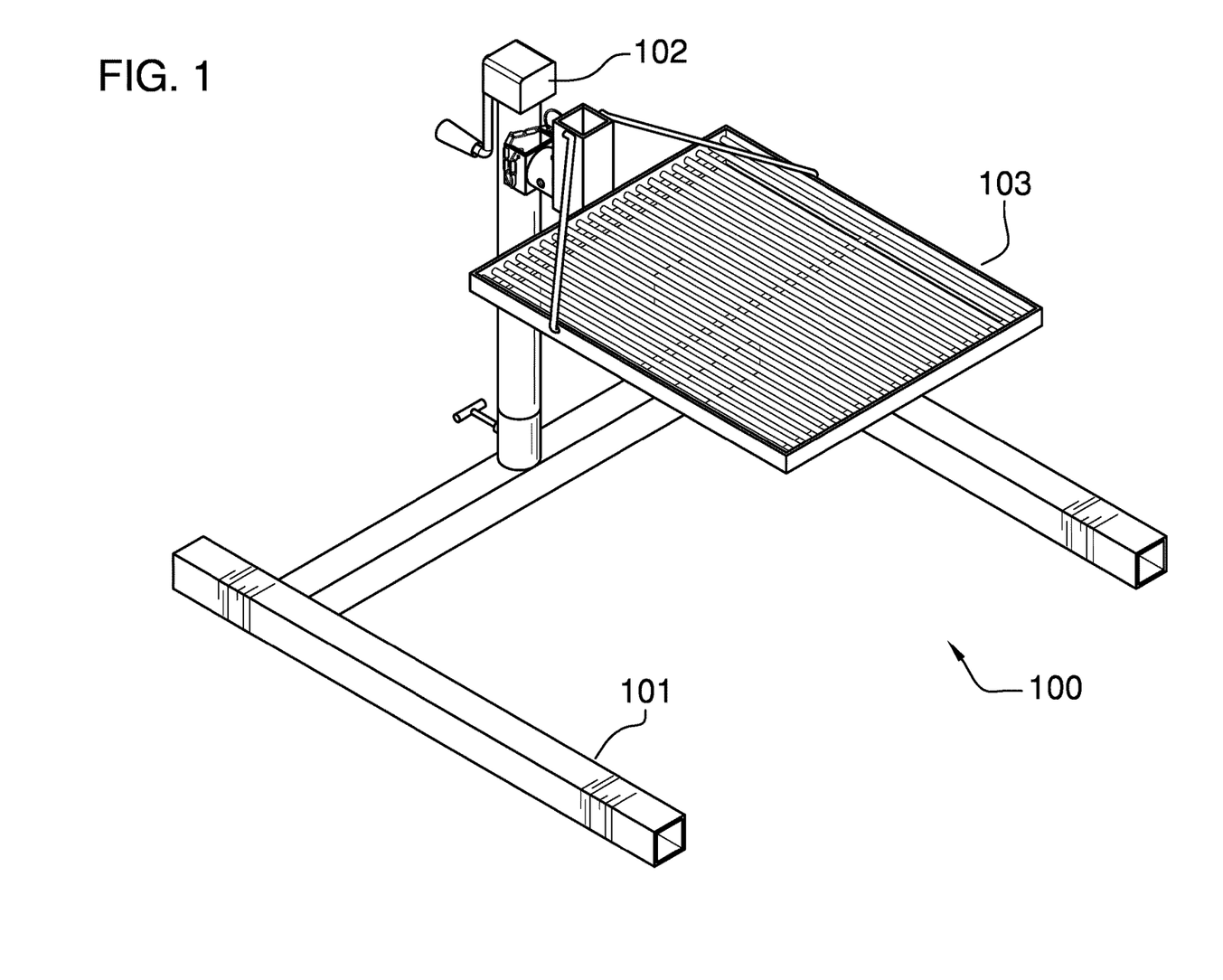
FIG. 1 is a perspective view of an embodiment of the disclosure.
Figure 2:
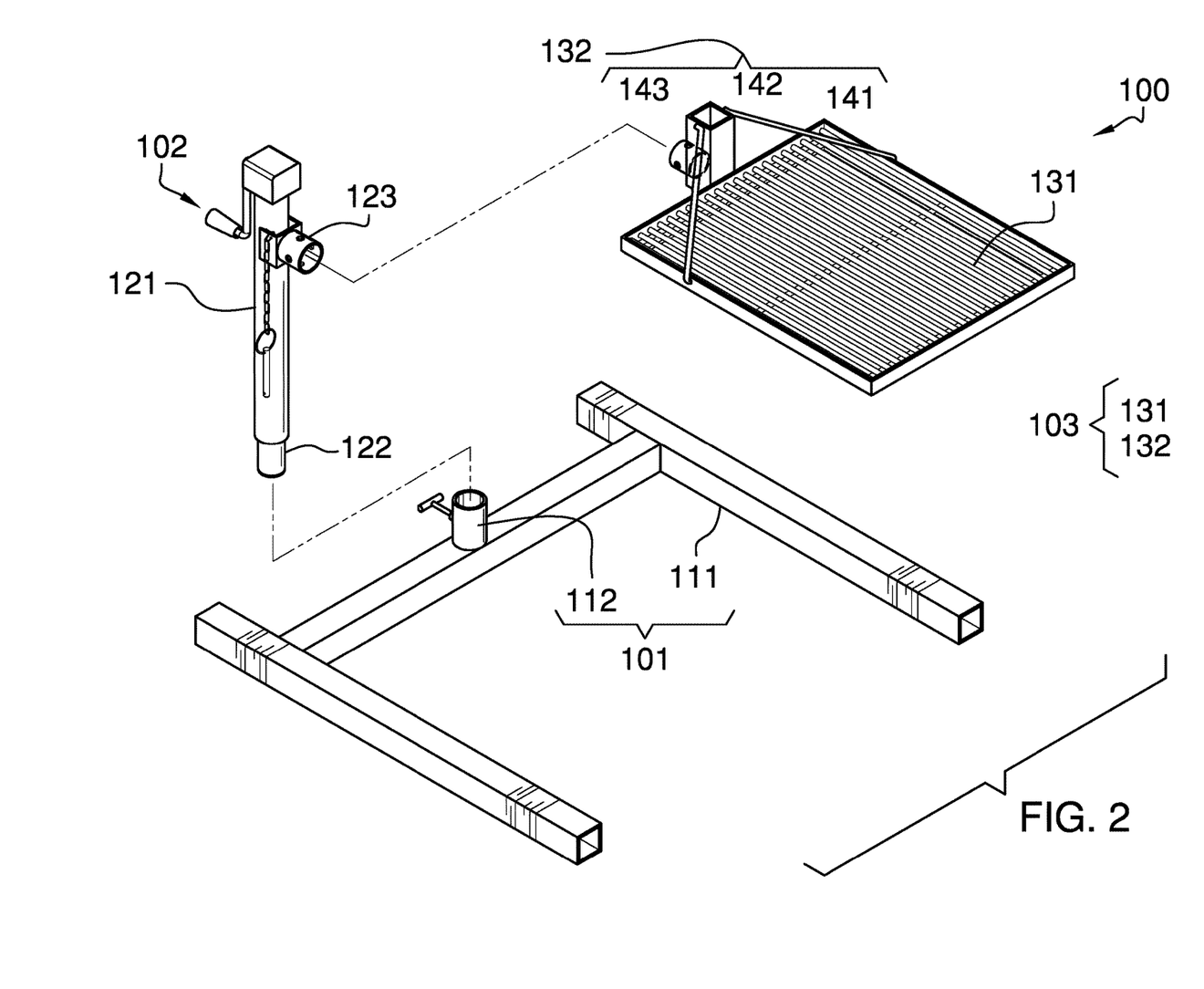
FIG. 2 is an exploded view of an embodiment of the disclosure.
Figure 3:
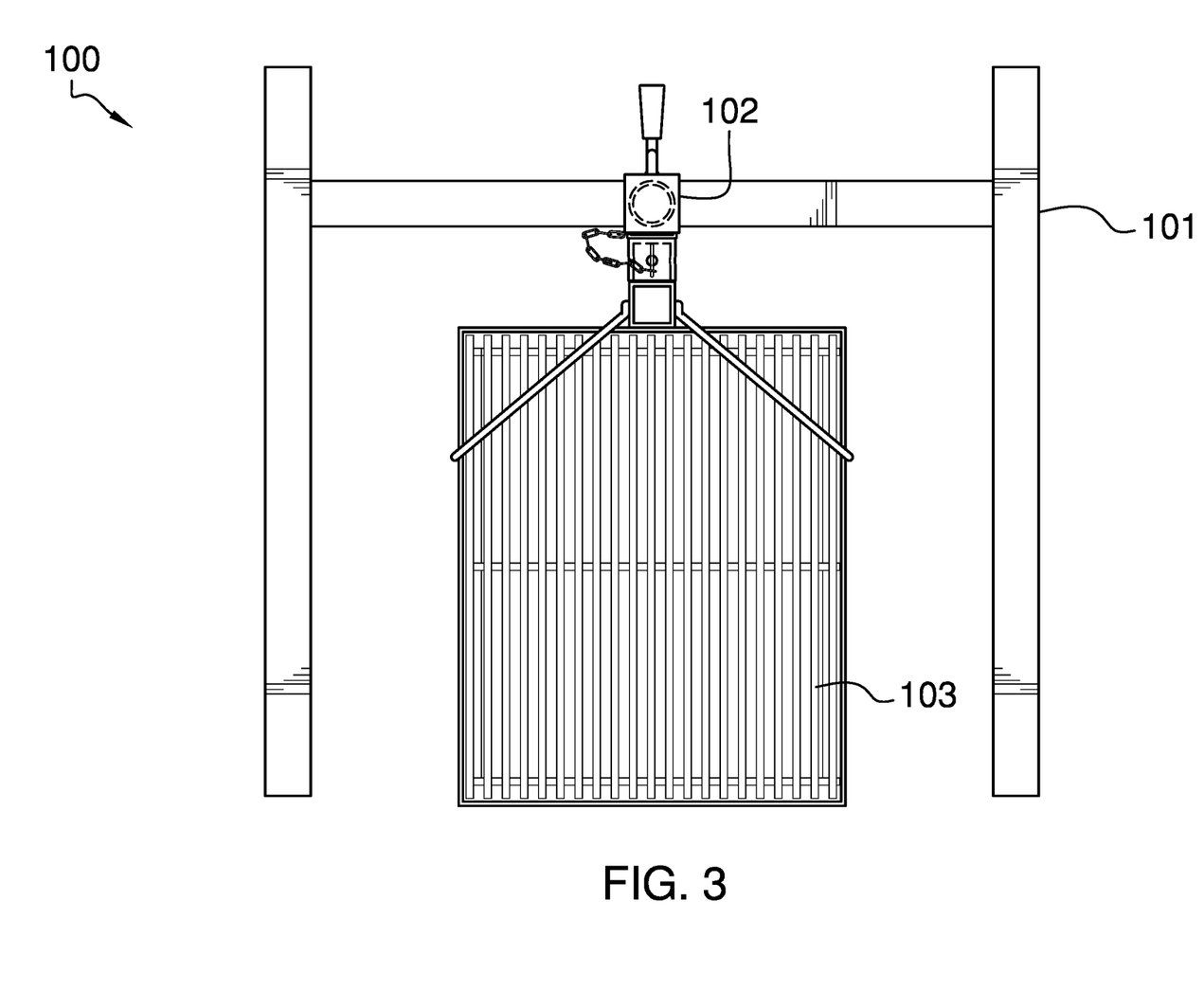
FIG. 3 is a top view of an embodiment of the disclosure.
Figure 4:
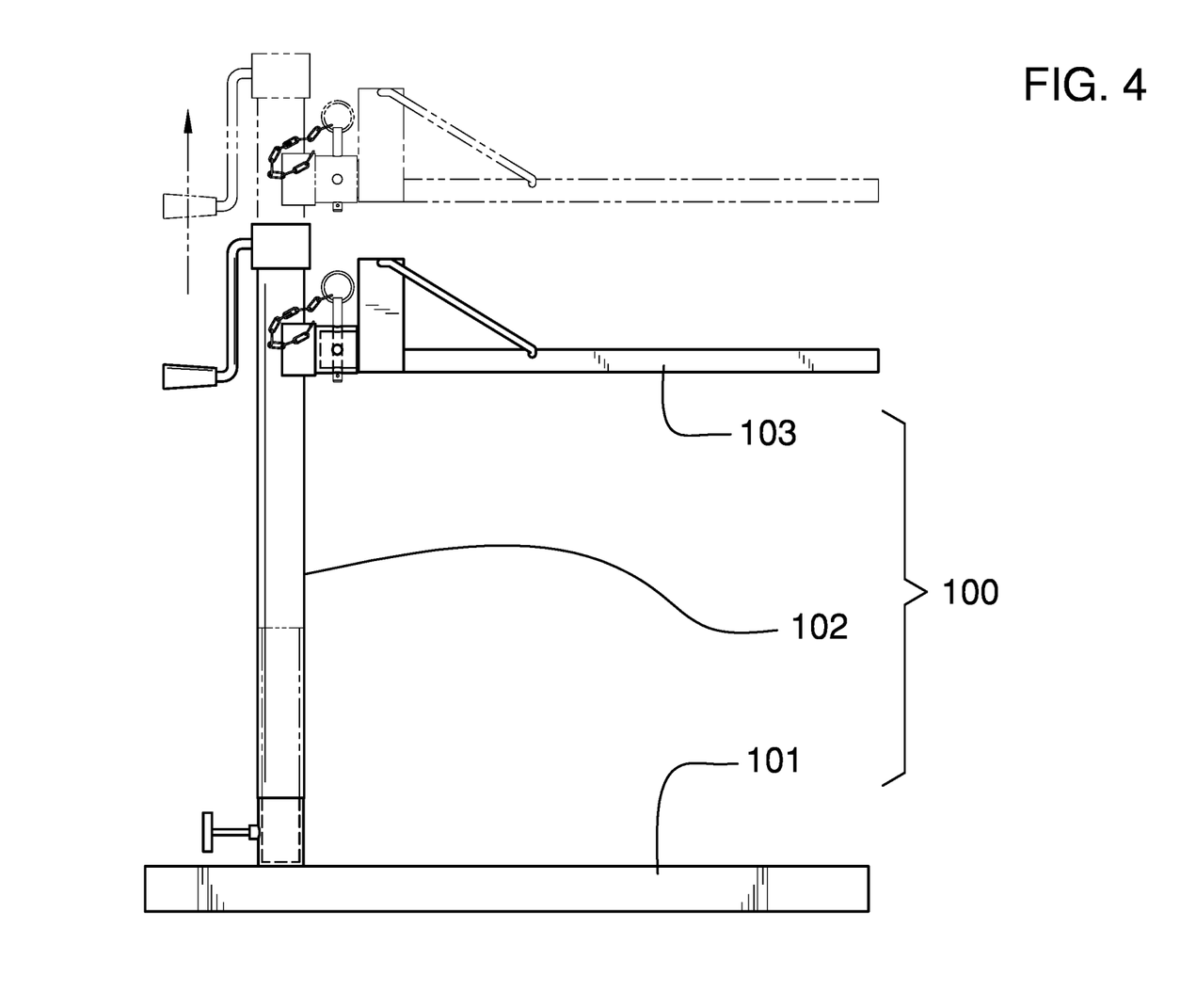
FIG. 4 is a side view of an embodiment of the disclosure.
Figure 5:
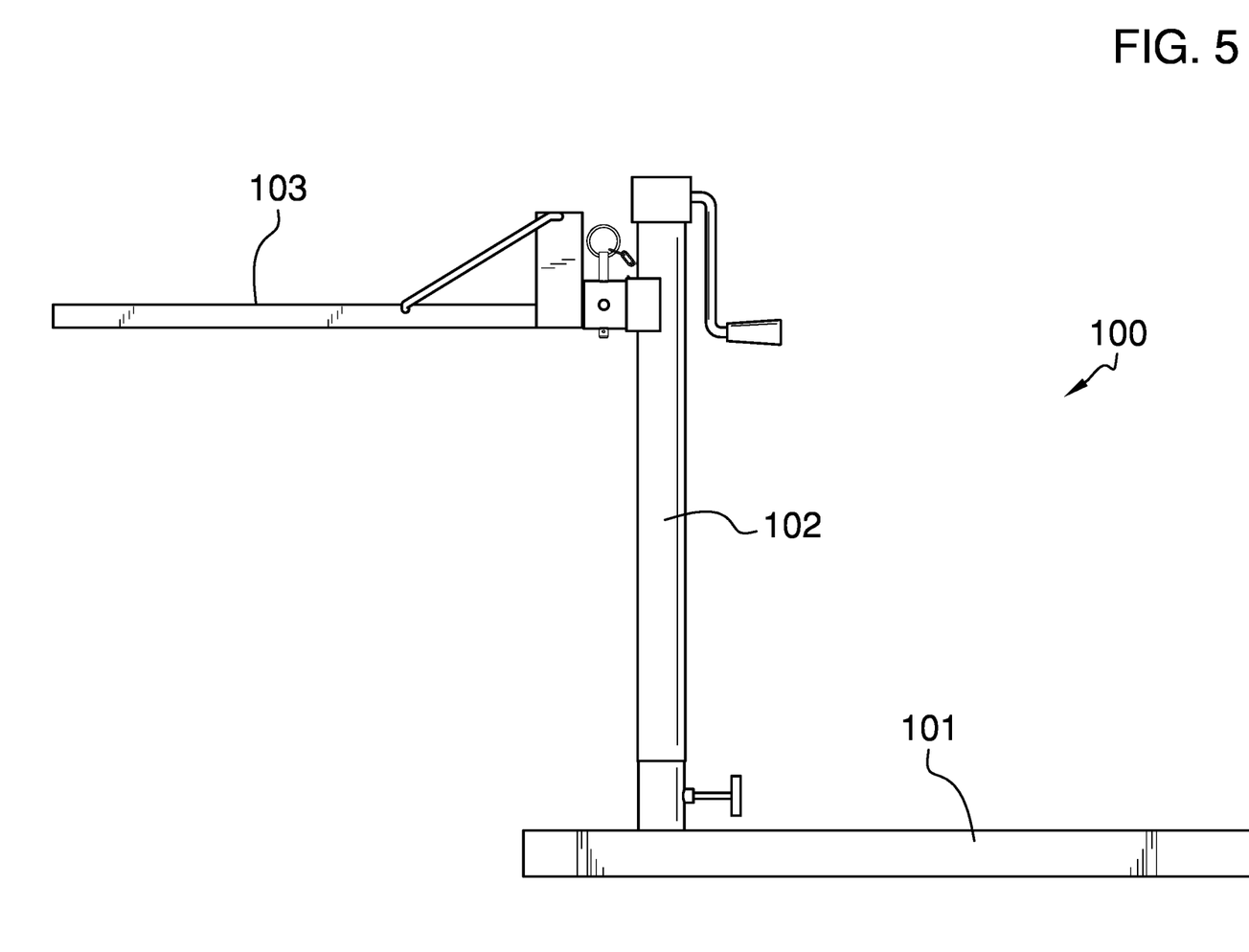
FIG. 5 is a side view of an embodiment of the disclosure.
Figure 6:
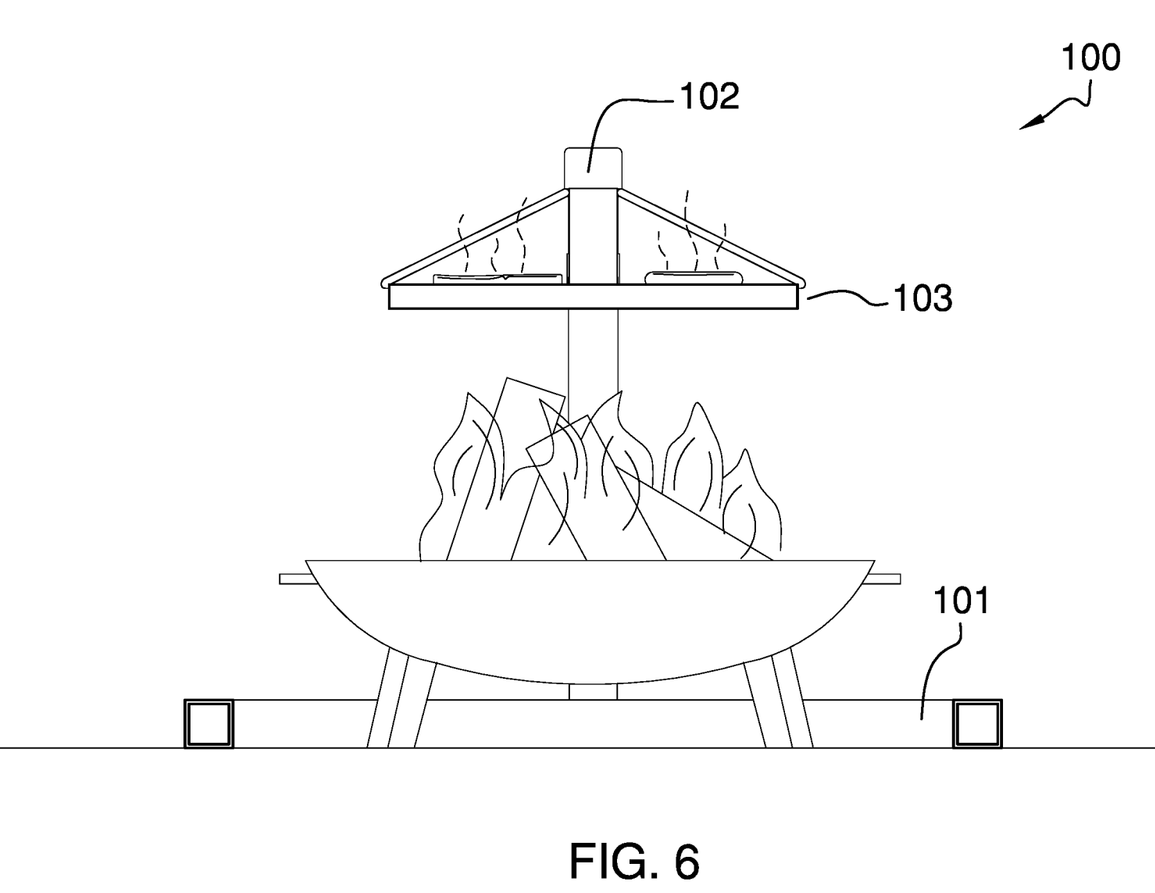
FIG. 6 is an in-use view of an embodiment of the disclosure.

Detailed reference will now be made to one or more potential embodiments of the disclosure, which are illustrated in FIGS. 1 through 6.

The portable outdoor cooking grate for use with an open fire 100 (hereinafter invention) is configured for use with a fire pit. The fire pit is a structure that is used to safely contain a combustion reaction. The invention 100 is a mechanical structure that is placed over the combustion reaction. The invention 100 is configured for use with a foodstuff. The invention 100 cooks the foodstuff. The invention 100 comprises a pedestal structure 101, a stanchion structure 102, and a grill structure 103. The stanchion structure 102 removably attaches to the pedestal structure 101.

The grill structure 103 removably attaches to the stanchion structure 102. The pedestal structure 101 forms a base that transfers the load of the stanchion structure 102 and the grill structure 103 to a supporting surface. The stanchion structure elevates the grill structure 103 above the pedestal structure 101. The grill structure 103 elevates the foodstuff over the combustion reaction.

The invention 100 is a collapsible structure. The combined pedestal structure 101, the stanchion structure 102, and the grill structure 103 collapse to a minimum perimetrical boundary by detaching from each other. In the collapsed state, the invention 100 is a portable structure.

The pedestal structure 101 is a mechanical structure. The pedestal structure 101 is a load bearing structure. The pedestal structure 101 is a rigid structure. The pedestal structure 101 forms the inferior structure of the invention 100. The pedestal structure 101 transfers the loads of the stanchion structure 102 and the grill structure 103 to a supporting surface. The pedestal structure 101 has the primary shape of a u-shaped structure. The stanchion structure 102 removably attaches to the pedestal structure 101. The pedestal structure 101 comprises a u-shaped base structure 111 and a pedestal mortise 112.

The u-shaped base structure 111 is a mechanical structure. The u-shaped base structure 111 is a roughly u-shaped structure. The u-shaped base structure 111 forms the inferior structure of the invention 100. The u-shaped base structure 111 rests directly on the supporting surface. The u-shaped base structure 111 forms the load bearing structure that transfers the loads of the stanchion structure 102 and the grill structure 103 to the supporting surface. The u-shape of the u-shaped base structure 111 allows the invention 100 to be positioned such that the combustion reaction can be positioned between the first arm and the second arm of the u-shape of the u-shaped base structure 111.

The pedestal mortise 112 is a portion of the device that attaches the stanchion structure 102 to the pedestal structure 101. The pedestal mortise 112 is a negative space that is formed on the superior surface of the u-shaped base structure 111. The stanchion structure 102 attaches to the pedestal structure 101 by inserting into the pedestal mortise 112.

The stanchion structure 102 is a mechanical structure. The stanchion structure 102 is a load bearing structure. The stanchion structure 102 is a rigid structure. The pedestal structure 101 removably attaches to the stanchion structure 102. The grill structure 103 removably attaches to the stanchion structure 102. The stanchion structure 102 is a vertically oriented structure. The stanchion structure 102 elevates the grill structure 103 above the pedestal structure 101. The stanchion structure 102 is an adjustable structure. By adjustable is meant that the mechanical structure of the stanchion structure 102 is used to adjust the elevation of the grill structure 103 above the pedestal structure 101. The stanchion structure 102 comprises a jack structure 121, a stanchion tenon 122, and a stanchion mortise 123.

The jack structure 121 is a mechanical structure. The jack structure 121 is a load bearing structure. The jack structure 121 is a rigid structure. The jack structure 121 is a vertically oriented structure. The jack structure 121 forms the load path that transfers the load of the grill structure 103 to the pedestal structure 101. The jack structure 121 forms a jack that elevates the grill structure 103 above the pedestal structure 101. The jack structure 121 is adjustable. By adjustable is meant that the elevation of the grill structure above the combustion reaction adjusts by adjusting the jack structure 121.

The stanchion tenon 122 is a prism shaped structure. The stanchion tenon 122 forms the inferior structure of the jack structure 121. The stanchion tenon 122 is a portion of the device that attaches the jack structure 121 to the pedestal structure 101. The stanchion tenon 122 is geometrically similar to the pedestal mortise 112 of the pedestal structure 101. The stanchion tenon 122 removably attaches the stanchion structure 102 to the pedestal structure 101 by inserting into the pedestal mortise 112.

The stanchion mortise 123 is a portion of the device that attaches the grill structure 103 to the stanchion structure 102. The stanchion mortise 123 is a negative space that is formed on the stanchion structure 102. The grill structure 103 removably attaches to the stanchion structure 102 by inserting into the stanchion mortise 123.

The grill structure 103 is a mechanical structure. The grill structure 103 is a load bearing structure. The grill structure 103 is a rigid structure. The grill structure 103 is a disk shaped structure. The congruent ends of the disk shaped structure of the grill structure 103 are horizontally oriented. The congruent ends of the disk shaped structure of the grill structure 103 forms a supporting surface that positions the foodstuff above the combustion reaction. The grill structure 103 removably attaches to the stanchion structure 102. The pedestal structure 101 and the stanchion structure 102 are positioned such that the grill structure 103 is positioned directly above a combustion reaction when the invention 100 is in use. The grill structure 103 comprises a grate 131 and a grill stanchion 132.

The grate 131 is a mechanical structure. The grate 131 is a load bearing structure. The grate 131 is a rigid structure. The grate 131 is a horizontally oriented structure. The grate 131 is a disk shaped structure. The grate 131 forms the horizontally oriented surface that is positioned over the combustion reaction. The grate 131 elevates the foodstuff above the combustion reaction.

The grill stanchion 132 is a mechanical structure. The grill stanchion 132 is a load bearing structure. The grill stanchion 132 is a rigid structure. The grill stanchion 132 attaches the grate 131 to the stanchion mortise 123 of the stanchion structure 102. The grill stanchion 132 forms a brace that improves the horizontal stability of the grate 131. The grill stanchion 132 attaches to the lateral face of the disk structure of the grate 131. The grill stanchion 132 further comprises a first gusset 141, a second gusset 142, and a grill tenon 143.

The first gusset 141 is a mechanical structure. The first gusset 141 is a load bearing structure. The first gusset 141 is a rigid structure. The first gusset 141 forms a gusset that secures the grill stanchion 132 to the lateral face of the disk structure of the grate 131. The first gusset 141 forms a brace that horizontally stabilizes the grate 131 to prevent horizontal motion when a load is applied to the grate 131.

The second gusset 142 is a mechanical structure. The second gusset 142 is a load bearing structure. The second gusset 142 is a rigid structure. The second gusset 142 forms a gusset that secures the grill stanchion 132 to the lateral face of the disk structure of the grate 131. The second gusset 142 forms a brace that horizontally stabilizes the grate 131 to prevent horizontal motion when a load is applied to the grate 131.

The grill tenon 143 is a prism shaped structure. The grill tenon 143 attaches to the grill stanchion 132 of the grill structure 103. The grill tenon 143 is a portion of the device that attaches the grill stanchion 132 to the stanchion structure 102. The grill tenon 143 is geometrically similar to the stanchion mortise 123 of the stanchion structure 102. The grill tenon 143 removably attaches the grill structure 103 to the stanchion structure 102 by inserting into the stanchion mortise 123.

The following definitions were used in this disclosure:

Adjustable: As used in this disclosure, the term adjustable refers to the ability of a structure or device to change its fit (or form factor), appearance, input requirements, or its output to meet the needs of a situation.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Beam: As used in this disclosure, a beam is a horizontally oriented prism shaped shaft that: 1) is suspended above a supporting surface; and, 2) bears a load.

Brace: As used in this disclosure, a brace is a rigid structural element that interconnects a first object with a second object to form a resulting object. The brace forms an energy transfer structure that transfers, distributes, and shares a force acting on the first object between the first object and the second object. The brace is used to support, stabilize, or otherwise steady an object.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Foodstuff: As used in this disclosure, a foodstuff refers to an edible material that is used as food.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grate: As used in this disclosure, a grate is a mesh structure that forms a horizontally oriented surface that supports a solid object while allowing fluids to flow around the solid object.

Grill: As used in this disclosure, a grill is a metal structure that is used for cooking food over an open flame. The open flame is generated by a combustion reaction. While there are structural difference, in this disclosure, the term hibachi is a synonym for grill.

Gusset: As used in this disclosure, a gusset is an angled structural member used to form a portion of the load path of section of a framework. By angled is meant that the gusset is neither parallel nor perpendicular to the force of gravity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Jack: As used in this disclosure, a jack is a mechanical device for elevating or lifting a load. A jack is also called a lift. The elevation of the load carried by the jack is generally adjustable.

Jib: As used in this disclosure, a jib is a structure that: 1) is mounted with a free end in the manner of a cantilever; and, 2) supports a load.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Mortise: As used in this disclosure, a mortise is a prism-shaped negative space formed in an object that is designed to receive a geometrically similar object referred to as a tenon. Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Portable: As used in this disclosure, the term portable refers to an object with a form factor and weight that allows an individual to physically carry or manually transport the object to its intended destination.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reduction-Oxidation Reaction: As used in this disclosure, a reduction-oxidation reaction (also known as a redox reaction) is a chemical reaction involving the transfer of electrons between the reactants of the reaction.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tenon: As used in this disclosure, a tenon is a prism-shaped structure that fits into a mortise such that the tenon is secured to the mortise. The tenon is geometrically similar to the mortise.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A portable outdoor cooking grate comprising
a pedestal structure, a stanchion structure, and a grill structure;
wherein the stanchion structure removably attaches to the pedestal structure;
wherein the grill structure removably attaches to the stanchion structure;
wherein the stanchion structure comprises a jack structure, a stanchion tenon, and a stanchion mortise;
wherein the stanchion tenon attaches to the jack structure;
wherein the stanchion mortise attaches to the jack structure;
wherein the jack structure is a vertically oriented structure;
wherein the jack structure forms a load path that transfers a load of the grill structure to the pedestal structure;
wherein the jack structure forms a jack that elevates the grill structure above the pedestal structure;
wherein the jack structure is adjustable;
wherein by adjustable is meant that the elevation of the grill structure above the combustion reaction adjusts by adjusting the jack structure in order to raise and lower the grill structure with respect to the combustion reaction.

2. The portable outdoor cooking grate according to claim 1 wherein the portable outdoor cooking grate is a mechanical structure that is placed over a combustion reaction;
wherein the portable outdoor cooking grate is configured for use with a foodstuff;
wherein the portable outdoor cooking grate cooks the foodstuff;
wherein the pedestal structure forms a base that transfers the load of the stanchion structure and the grill structure to a supporting surface;
wherein the stanchion structure elevates the grill structure above the pedestal structure;
wherein the grill structure elevates the foodstuff over the combustion reaction.

3. The portable outdoor cooking grate according to claim 2 wherein the portable outdoor cooking grate is a collapsible structure;
wherein the combined pedestal structure, the stanchion structure, and the grill structure collapse to a minimum perimetrical boundary by detaching from each other;
wherein the portable outdoor cooking grate is a portable structure.

4. The portable outdoor cooking grate according to claim 3 wherein the pedestal structure is a mechanical structure;
wherein the pedestal structure is a load bearing structure;
wherein the pedestal structure is a rigid structure;
wherein the pedestal structure forms the inferior structure of the portable outdoor cooking grate;
wherein the pedestal structure transfers the loads of the stanchion structure and the grill structure to a supporting surface;
wherein the pedestal structure has the primary shape of a u-shaped structure;
wherein the stanchion structure removably attaches to the pedestal structure.

5. The portable outdoor cooking grate according to claim 4 wherein the stanchion structure attaches to the pedestal structure by inserting into the pedestal mortise;
wherein the stanchion structure is a mechanical structure;
wherein the stanchion structure is a load bearing structure;
wherein the stanchion structure is a rigid structure;
wherein the pedestal structure removably attaches to the stanchion structure;
wherein the grill structure removably attaches to the stanchion structure;
wherein the stanchion structure is a vertically oriented structure;
wherein the stanchion structure elevates the grill structure above the pedestal structure;
wherein the stanchion structure is an adjustable structure;

wherein by adjustable is meant that the mechanical structure of the stanchion structure is used to adjust the elevation of the grill structure above the pedestal structure.

6. The portable outdoor cooking grate according to claim 5 wherein the grill structure is a mechanical structure;
wherein the grill structure is a load bearing structure;
wherein the grill structure is a rigid structure;
wherein the grill structure is a disk shaped structure;
wherein the congruent ends of the disk shaped structure of the grill structure are horizontally oriented;
wherein the congruent ends of the disk shaped structure of the grill structure forms a supporting surface above the combustion reaction;
wherein the grill structure removably attaches to the stanchion structure;
wherein the pedestal structure and the stanchion structure are positioned such that the grill structure is positioned directly above a combustion reaction.

7. The portable outdoor cooking grate according to claim 6 wherein the pedestal structure comprises a u-shaped base structure and a pedestal mortise;
wherein the pedestal mortise attaches to the u-shaped structure.

8. The portable outdoor cooking grate according to claim 7 wherein the grill structure comprises a grate and a grill stanchion;
wherein the grill stanchion attaches to the grate.

9. The portable outdoor cooking grate according to claim 8 wherein the u-shaped base structure is a mechanical structure;
wherein the u-shaped base structure is a roughly u-shaped structure;
wherein the u-shaped base structure forms the inferior structure of the portable outdoor cooking grate;
wherein the u-shaped base structure rests directly on the supporting surface;
wherein the u-shaped base structure forms the load bearing structure that transfers the loads of the stanchion structure and the grill structure to the supporting surface;
wherein the u-shape of the u-shaped base structure allows the portable outdoor cooking grate to be positioned such that the combustion reaction can be positioned between the first arm and the second arm of the u-shape of the u-shaped base structure;
wherein the pedestal mortise is a portion of the device that attaches the stanchion structure to the pedestal structure;
wherein the pedestal mortise is a negative space that is formed on the superior surface of the u-shaped base structure.

10. The portable outdoor cooking grate according to claim 9 wherein the stanchion tenon forms the inferior structure of the jack structure;
wherein the stanchion tenon is a portion of the device that attaches the jack structure to the pedestal structure;
wherein the stanchion tenon is geometrically similar to the pedestal mortise of the pedestal structure;
wherein the stanchion tenon removably attaches the stanchion structure to the pedestal structure by inserting into the pedestal mortise;
wherein the stanchion mortise is a portion of the device that attaches the grill structure to the stanchion structure;
wherein the stanchion mortise is a negative space that is formed on the stanchion structure,
wherein the grill structure removably attaches to the stanchion structure by inserting into the stanchion mortise.

11. The portable outdoor cooking grate according to claim 10 wherein the grate is a mechanical structure;
wherein the grate is a load bearing structure;
wherein the grate is a rigid structure;
wherein the grate is a horizontally oriented structure;
wherein the grate is a disk shaped structure;
wherein the grate forms the horizontally oriented surface that is positioned over the combustion reaction.

12. The portable outdoor cooking grate according to claim 11 wherein the grill stanchion is a mechanical structure;
wherein the grill stanchion is a load bearing structure;
wherein the grill stanchion is a rigid structure;
wherein the grill stanchion attaches the grate to the stanchion mortise of the stanchion structure;
wherein the grill stanchion forms a brace that improves the horizontal stability of the grate;
wherein the grill stanchion attaches to the lateral face of the disk structure of the grate.

13. The portable outdoor cooking grate according to claim 12 wherein the grill stanchion further comprises a first gusset, a second gusset, and a grill tenon;
wherein the first gusset is a mechanical structure;
wherein the first gusset is a load bearing structure;
wherein the first gusset is a rigid structure;
wherein the first gusset forms a gusset that secures the grill stanchion to the lateral face of the disk structure of the grate;
wherein the first gusset forms a brace that horizontally stabilizes the grate to prevent horizontal motion when a load is applied to the grate;
wherein the second gusset is a mechanical structure;
wherein the second gusset is a load bearing structure;
wherein the second gusset is a rigid structure;
wherein the second gusset forms a gusset that secures the grill stanchion to the lateral face of the disk structure of the grate;
wherein the second gusset forms a brace that horizontally stabilizes the grate to prevent horizontal motion when a load is applied to the grate;
wherein the grill tenon attaches to the grill stanchion of the grill structure;
wherein the grill tenon is a portion of the device that attaches the grill stanchion to the stanchion structure;
wherein the grill tenon is geometrically similar to the stanchion mortise of the stanchion structure;
wherein the grill tenon removably attaches the grill structure to the stanchion structure by inserting into the stanchion mortise.

\* \* \* \* \*

UNITED STATES PATENT AND TRADEMARK OFFICE
CERTIFICATE OF CORRECTION

| | | |
|---|---|---|
| PATENT NO. | : 12,520,966 B1 | Page 1 of 1 |
| APPLICATION NO. | : 17/943323 | |
| DATED | : January 13, 2026 | |
| INVENTOR(S) | : Rhett Penner | |

It is certified that error appears in the above-identified patent and that said Letters Patent is hereby corrected as shown below:

On the Title Page

Item [54], and in the Specification Column 1, Line 1 the word "COOKING" should read "COOLING".

Signed and Sealed this
Tenth Day of February, 2026

John A. Squires
*Director of the United States Patent and Trademark Office*